(12) United States Patent
Tabata

(10) Patent No.: US 10,746,966 B2
(45) Date of Patent: Aug. 18, 2020

(54) IMAGING OPTICAL SYSTEM

(71) Applicant: Nanchang O-FILM Optical-Electronic Tech CO., LTD, Nanchang (CN)

(72) Inventor: Tomio Tabata, Tokyo (JP)

(73) Assignee: NANCHANG O-FILM OPTICAL-ELECTRONIC TECH CO., LTD, Nanchang (CN)

(*) Notice: Subject to any disclaimer, the term of this patent is extended or adjusted under 35 U.S.C. 154(b) by 205 days.

(21) Appl. No.: 16/044,441

(22) Filed: Jul. 24, 2018

(65) Prior Publication Data

US 2019/0049699 A1 Feb. 14, 2019

(30) Foreign Application Priority Data

Aug. 12, 2017 (JP) ................. 2017-156277

(51) Int. Cl.
  *G02B 13/00* (2006.01)
  *G02B 9/62* (2006.01)
  *G02B 13/02* (2006.01)

(52) U.S. Cl.
  CPC .......... *G02B 13/0045* (2013.01); *G02B 9/62* (2013.01); *G02B 13/02* (2013.01)

(58) Field of Classification Search
  CPC ...... G02B 13/0045; G02B 13/02; G02B 9/62; G02B 27/0025; G02B 13/04; G02B 13/18; G02B 3/04
  See application file for complete search history.

(56) References Cited

U.S. PATENT DOCUMENTS

| 2015/0177483 | A1  | 6/2015 | You |
| 2016/0054543 | A1* | 2/2016 | Nabeta ............... G02B 27/0025 359/713 |

(Continued)

FOREIGN PATENT DOCUMENTS

| CN | 106371193 A  | 2/2017 |
| JP | 2016-114803  | 6/2016 |
| TW | 201608268 A  | 3/2016 |

OTHER PUBLICATIONS

Non-Final Office Action dated Dec. 27, 2019, issued on U.S. Appl. No. 16/037,129 entitled "Imaging Lens and Imaging Apparatus" in the name of Nanchang O-film Optical-Electronic Tech Co Ltd.

(Continued)

*Primary Examiner* — Joseph P Martinez
*Assistant Examiner* — Vipin Patel
(74) *Attorney, Agent, or Firm* — Franklin & Associates International Inc; Matthew Lambrinos

(57) ABSTRACT

An imaging optical system, including: a first lens being a meniscus lens with a positive refractive power, the first lens having a convex surface facing the object side; a second lens being a biconvex lens; a third lens being a meniscus lens with a negative refractive power, the third lens having a convex surface facing the object side; a fourth lens being a meniscus lens, the fourth lens having a convex surface or a concave surface facing the object side; a fifth lens having a concave surface facing the object side; and a sixth lens having a convex surface facing the image side; at least one surface of two surfaces of the lenses L1 to L6 has an aspherical shape. The imaging optical system satisfies the following conditions (1) and (2):

$$0.23 < Y/f < 0.29 \quad (1)$$
$$0.9 < TTL/f < 1.0 \quad (2).$$

7 Claims, 9 Drawing Sheets

(56) References Cited

U.S. PATENT DOCUMENTS

| | | |
|---|---|---|
| 2016/0131899 A1 | 5/2016 | Jo |
| 2016/0139368 A1 | 5/2016 | You |
| 2016/0195691 A1* | 7/2016 | Bito .................. G02B 13/0045 359/740 |
| 2016/0231532 A1 | 8/2016 | Huang et al. |
| 2016/0282588 A1* | 9/2016 | Sekine ............... G02B 13/0045 |
| 2017/0023769 A1 | 1/2017 | Jo |
| 2017/0045717 A1 | 2/2017 | Park |
| 2019/0064485 A1 | 2/2019 | Arita |
| 2019/0265440 A1 | 8/2019 | Tabata |

OTHER PUBLICATIONS

European Search Report and Opinion dated Jan. 7, 2019 issued on European Patent Application EP18176026 in the name of Nanchang O-Film Optical-Electronic Tech Co., Ltd, eight (8) pages.

Office Action dated Oct. 26, 2018; Taiwanese Patent Application No. 107121950.

\* cited by examiner

IMAGING OPTICAL SYSTEM

CROSS-REFERENCE TO RELATED APPLICATION

This application claims the benefit of Japan Patent Application No. 2017-156277, filed Aug. 12, 2017, the entire content of which is incorporated herein in its entirety.

TECHNICAL FIELD

The present disclosure relates to an imaging optical system used in an imaging apparatus which is mounted on, for example, a mobile phone, a smartphone, or the like.

BACKGROUND

In recent years, it is general to mount imaging apparatuses on mobile phones, smartphones, tablet terminals, personal computers, and the like. In the imaging apparatuses, imaging elements such as charge coupled device (CCD) image sensor and complementary metal oxide semiconductor (CMOS) image sensor are used. In such mobile phones, smartphones, and the like, image processing is commonly used for digital zooming, to implement a digital zooming with a higher magnification, a long focal length lens disclosed in Patent Document 1 can be used as an imaging optical system.

Patent Document 1: Japan Patent Publication No. 2016-114803.

However, the long focal length lens disclosed in Patent Document 1, as a long focal length system lens conventionally used in the mainstream digital zooming system together with a wide-angle lens, has a field angle structure that has to be broadened. Therefore, when the digital zooming is performed, increasing the zooming magnification can cause problems of thicker pixels and significantly deteriorated image quality.

SUMMARY

The present disclosure is directed to an imaging optical system with a narrow field angle that can get high resolution images while performing digital zooming.

To achieve previously described purpose, an imaging optical system includes, in order from an object side toward an image side, a first lens being a meniscus lens with a positive refractive power, the first lens having a convex surface facing the object side, and at least one of two surfaces thereof having an aspherical shape; a second lens being a biconvex lens, and at least one of two surfaces having an aspherical shape; a third lens being a meniscus lens with a negative refractive power, the third lens having a convex surface facing the object side, and at least one of two surfaces having an aspherical shape; a fourth lens being a meniscus lens, the fourth lens having a convex surface or a concave surface facing the object side, and at least one of two surfaces having an aspherical shape; a fifth lens having a concave surface facing the object side, and at least one of two surfaces having an aspherical shape; and a sixth lens having a convex surface facing the image side, and at least one of two surfaces having an aspherical shape, the imaging optical system satisfies the following conditions (1) and (2):

$$0.23 < Y/f < 0.29 \quad (1)$$

$$0.9 < TTL/f < 1.0 \quad (2)$$

Y is a maximal image height, f is a focal length of the overall system, and TTL is a total track length.

These and other objects, advantages, purposes and features will become apparent upon review of the following specification in conjunction with the drawings.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The imaging optical system according to the embodiments will be described in detail with the following drawings. The imaging optical system according to the embodiments is used in an imaging apparatus which is mounted on, a mobile phone, a smartphone, or the like.

Figure 1:
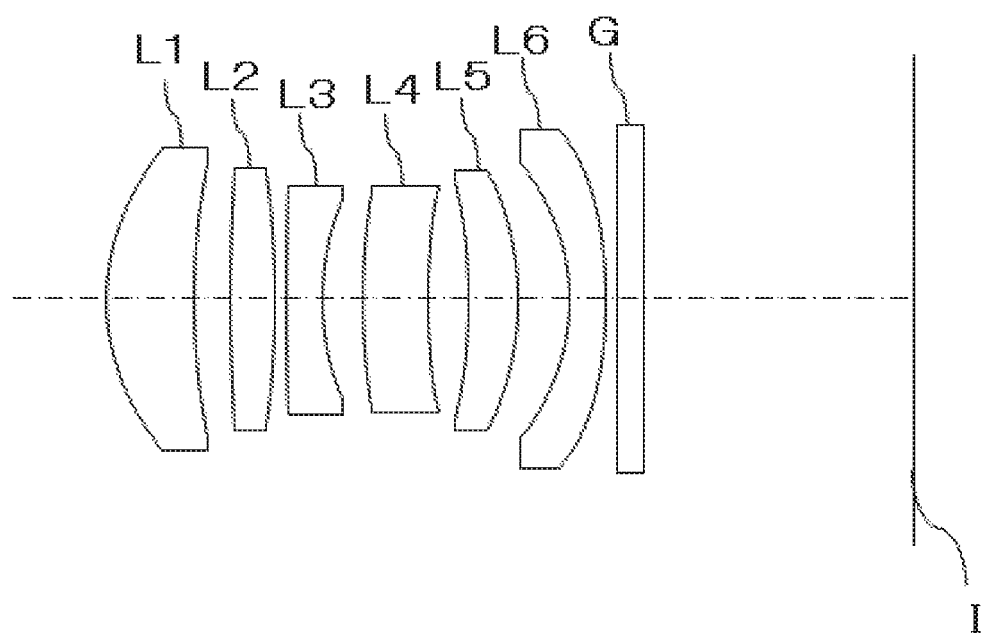
FIG. 1 is a cross-sectional view showing lenses structure of an imaging optical system according to a first embodiment.

Referring to FIG. 1, the imaging optical system includes a first lens L1, a second lens L2, a third lens L3, a fourth lens L4, a fifth lens L5, and a sixth lens L6, which are successively arranged in order from an object side toward an image side.

The first lens L1 is a meniscus objective lens with a positive refractive power, and the first lens L1 has a convex surface facing the object side. The second lens L2 is a biconvex lens, and the second lens L2 is a relay lens with an aspherical surface for spherical aberration correction and having a function of adjusting the generated chromatic aberration via the lens thickness. The third lens L3 is a meniscus lens with a negative refractive power, and the third lens L3 has a convex surface facing the object side, and configured to coordinately determine a total track length (TTL) with the first lens L1. The fourth lens L4 has a convex surface or a concave surface facing the object side. The fifth lens L5 has a concave surface facing the object side. The six lens L6 has a convex surface facing an image side.

In addition, the two surfaces of the first lens L1 to the sixth lens L6 are aspherical. An optical component G such as a low-pass filter, an infrared-cut filter (IRCF), or a glass cover is provided between the sixth lens L6 and an image surface I.

The first lens L1 and the second lens L2 forms an integrated structure with a positive focal power, and the third lens L3 has structure with a negative focal power. Specifically, in order to reduce the TTL, the surface facing the object side of the first lens L has a relatively strong positive focal power, and the surface facing the image side has a relatively strong negative focal power. Via the relatively strong refractive indexes of the two surfaces, a width of a beam emitted from the third lens L3 is smaller than a width of the beam that enters the first lens L1 in parallel. Therefore, a magnification of the combined system of lenses form the first lens L1 to the third lens L3 can be reduced, as a result, the TTL can be controlled to be relatively short.

Additionally, since at least three surfaces of the first lens L, the second lens L2, and the third lens L3 are aspherical, it is possible to effectively correct the spherical aberration generated in the surface of the first lens L1 facing the object side and the surface of the third lens L3 facing the image side, and the coma aberration generated therewith.

The fourth lens L4 is a relay lens configured to correct the coma aberration and the spherical aberration. The shape of the fourth lens L4 is changed according the TTL. Specifically, when the TTL is shortened, the fourth lens L4 has a concave surface facing the image side, thus the magnification chromatic aberration generated in the surface of the third lens L3 directing to the image side can be reduced. Otherwise, when the TTL is longer, the fourth lens L4 has a concave surface facing the object side, thus a correction effect of coma aberration and image surface curvature that is shared by the fifth lens L5 on a further rear side is improved.

The fifth lens L5 is a lens configured to correct chromatic aberration and to help correcting the image surface curvature and the coma aberration. The sixth lens L6 is a lens configured to effectively correct the image surface curvature and the distortion aberration. Additionally, the fifth lens L5 and the sixth lens L6 function as a field deflector.

Since the two surfaces of lenses from L1 to L6 are aspherical, a convergence of the light finally reaching the image surface I can be ensured.

In one embodiment, the first to the sixth lenses are made of a resin material, so as to reduce the weight and produce lenses in large quantity and at low cost.

Additionally, the imaging optical system according to the embodiment satisfies the following conditions (1) and (2):

$$0.23 < Y/f < 0.29 \quad (1)$$

$$0.9 < TTL/f < 1.0 \quad (2)$$

Y is a maximal image height, f is a focal length of the overall system, and TTL is the total track length.

The condition (1) is a condition to define the field angle of the imaging optical system, an expected imaging optical system with a narrow field angle can be implemented via satisfying the range of the condition (1). When the value is lower than the lower limit of the condition (1), a focal length of the overall system becomes longer, and the TTL becomes large. Additionally, the size of sensor becomes smaller and the image quality is deteriorated. When the value is higher than the higher limit of the condition (I), the focal length of the overall system becomes shorter than the size of sensor, thus the system becomes wide-angle which cannot serve as a long focal length to implement the purpose according to present disclosure.

The condition (2) is a condition to define a telephoto ratio (TTL/f). When the telephoto ratio is lower than the lower limit of the condition (2), the focal power of the read side lenses system becomes smaller, thus the magnification chromatic aberration can be generated, and the resolution of the image reduces. When the telephoto ratio is higher than the higher limit of the condition (2), the overall size of lenses becomes larger, not only the total length of lenses, but the radius of lenses become too large. Therefore, images with high resolution and lenses with compact sizes can be obtained via satisfying the range of the condition (2).

Additionally, the imaging optical system according to the embodiment satisfies the following condition (3):

$$0.6 < D/f < 0.8 \quad (3)$$

D is a distance between the surface of the first lens L facing the object side and the surface of the sixth lens facing the image side.

When the value is lower than the lower limit of the condition (3), inward-direction coma aberration and chromatic aberration on the optical axis are generated, thus the resolution of image is reduced. When the value is higher than the higher limit of the condition (3), vignette is generated due to an elongated lens barrel, and the amount of peripheral light is significantly decreased. Therefore, an image with higher resolution and enough amount of peripheral light can be obtained via satisfying the range of the condition (3).

Additionally, the imaging optical system according to the embodiment satisfies the following conditions (4) and (5):

$$-0.7 < f/f4 < 0.7 \quad (4)$$

$$0 < R10/R11 \quad (5)$$

f4 is a focal length of the fourth lens L4, R10 is a radius of curvature of the surface facing the image side of the fifth lens L5, and R11 is a radius of curvature of the surface facing the object side of the sixth lens L6.

Via satisfying the range of condition (4), the fourth lens L4 is a lens with relatively small focal power. Additionally, via satisfying the range of condition (5), the radius of curvature R10 of the fifth lens L5 facing the image side and the radius of curvature R11 of the sixth lens L6 toward the object side are both positive or both negative, whereby the effect of the field deflector of the fifth lens L5 and the sixth lens L6 is improved.

Additionally, the imaging optical system according to the embodiment satisfies the following condition (6):

$$0.25 < R1/f \quad (6)$$

R1 is a radius of curvature of the surface facing the object side of the first lens L1. When the value is lower than the lower limit of the condition (6), the aberration in the peripheral part of the pupil is particularly significant, thus increasing the diameter of the imaging optical system is difficult. In addition, since the error sensitivity is increased, the production efficiency is reduced. Therefore, via satisfying the condition (6), the diameter of the imaging optical system can be larger, and the production efficiency can be increased.

Additionally, the imaging optical system according to the embodiment satisfies the following condition (7):

$$0.35 < f12/f < 0.65 \quad (7)$$

f12 is a combined focal length of the first lens L1 and the second lens L2. When the value is lower than the lower limit of the condition (7), an excessive curvature of image surface is generated, and since the error sensitivity is increased, the production efficiency is reduced. When the value is higher than the higher limit of the condition (7), an axial chromatic aberration is generated, the contrast is deteriorated. Therefore, the production efficiency of the imaging optical system can be further improved, and sufficient contrast can be obtained via satisfying the range of the condition (7).

Numeral embodiments of the imaging optical system will be described in detail. Present disclosure is not limited to the embodiments.

FIG. 1 shows the lenses structure of the imaging optical system according to a first embodiment. The data of lenses of the imaging optical system according to the illustrated embodiment are shown in TABLE 1, the data of focal length f of overall system, the F-value, and the data of field angle are shown in TABLE 2, and the data of aspheric coefficients are show in TABLE 3. In TABLE 1, Si is a number of surfaces, the surface of the first lens L1 facing the object side is S1, and the number sequentially increases toward the image surface I, Ri is a radius of curvature of the i-th surface in order from the object side, Di is a distance between the i-th surface and the i+1-th surface in order from the object side. Additionally the unit of lengths in the TABLE is mim. Furthermore, Ndi is a refractive power of the optical element of the i-th surface in order from the object side with respective to d-line (wavelength 587.6 nm). νdi is an Abbe number of the optical element of the i-th surface in order from the object side with respective to d-line.

The data of aspheric coefficients are show in TABLE 3, and the aspheric shape is presented by the following formula:

$$Z = C \cdot h^2 / \{1 + (1 - K \cdot C^2 \cdot h^2)^{1/2}\} + A4 \cdot h^4 + A6 \cdot h^6 + A8 \cdot h^8 + A10 \cdot h^{10} + A12 \cdot h^{12} + A14 \cdot h^{14} + A16 \cdot h^{16} + A18 \cdot h^{18} + A20 \cdot h^{20}$$

Wherein Z is the aspheric depth, C is the reciprocal of the paraxial radius of curvature, K is the conic constant, h is the distance between the optical axis and the surface of lens, the aspheric coefficients of each degrees are A4, A6, A8, A10, A12, A14, A16, A18, and A20. Additionally, the "E-m" in the data of aspheric coefficients in TABLE 3 means "$\times 10^{-m}$".

TABLE 1

Embodiment 1

| Si | Ri | Di | Ndi | νdi |
|---|---|---|---|---|
| 1 | 2.381 | 0.943 | 1.544 | 56.0 |
| 2 | 7.170 | 0.380 | | |
| 3 | 15.784 | 0.490 | 1.535 | 57.1 |
| 4 | −12.463 | 0.121 | | |
| 5 | 20.412 | 0.398 | 1.661 | 20.4 |
| 6 | 3.170 | 0.434 | | |
| 7 | 6.674 | 0.689 | 1.544 | 56.0 |
| 8 | 7.620 | 0.444 | | |
| 9 | −6.043 | 0.521 | 1.661 | 20.4 |
| 10 | −3.223 | 0.567 | | |
| 11 | −2.205 | 0.396 | 1.544 | 56.0 |
| 12 | −4.942 | 0.100 | | |
| 13 | infinity | 0.300 | 1.517 | 64.2 |
| 14 | infinity | 2.893 | | |

TABLE 2

Embodiment 1

| | |
|---|---|
| focal length f | 9.216 |
| F-value | 2.8 |
| field angle | 32 degree |

TABLE 3

Embodiment 1 surface number

| | K | A4 | A6 | A8 |
|---|---|---|---|---|
| 1 | −0.3500E−01 | 8.6367E−04 | −1.2291E−04 | −2.9305E−05 |
| 2 | 0.0000E+00 | 1.3013E−04 | −5.1945E−05 | −3.4858E−05 |
| 3 | 0.0000E+00 | −4.1283E−04 | 2.3947E−04 | 9.8081E−05 |
| 4 | 0.0000E+00 | 4.6023E−05 | −5.8153E−04 | −2.2846E−04 |
| 5 | 0.0000E+00 | −9.1157E−04 | 2.8453E−04 | 6.1246E−05 |
| 6 | 0.0000E+00 | 3.6531E−03 | 4.1817E−04 | 6.1774E−04 |
| 7 | 0.0000E+00 | −4.2056E−03 | −5.9008E−04 | −7.6879E−04 |
| 8 | 0.0000E+00 | 6.4040E−03 | 1.2000E−03 | 1.1772E−03 |
| 9 | 0.0000E+00 | −5.2635E−03 | −1.0476E−03 | −1.9888E−04 |
| 10 | 0.0000E+00 | 2.2499E−03 | 5.4868E−04 | −1.0317E−04 |
| 11 | 0.0000E+00 | 6.5633E−03 | 8.0074E−04 | 3.1325E−04 |
| 12 | 0.0000E+00 | −9.2175E−3 | −7.9813E−04 | −1.1658E−04 | surface number

| | A10 | A12 | A14 | A16 |
|---|---|---|---|---|
| 1 | −1.0434E−05 | −4.2029E−06 | −1.6048E−06 | −5.4813E−07 |
| 2 | −9.6418E−06 | −2.1868E−07 | −1.0986E−05 | −6.5653E−07 |
| 3 | 2.2474E−05 | −3.4075E−06 | −7.5690E−06 | −5.5883E−06 |
| 4 | −7.4880E−05 | −1.9914E−05 | −4.6433E−06 | −1.8716E−06 |
| 5 | −1.2232E−05 | −1.9279E−05 | −4.8532E−06 | 8.1621E−06 |
| 6 | 5.3588E−04 | 3.6577E−04 | 1.9376E−04 | 7.7851E−05 |
| 7 | −1.4855E−04 | 3.4228E−04 | 4.4998E−04 | 2.9160E−04 |
| 8 | 6.0957E−04 | 2.4665E−04 | 1.4830E−04 | 1.4219E−04 |
| 9 | −1.1136E−05 | 3.4156E−05 | 2.9631E−05 | 1.9446E−05 |
| 10 | −1.0774E−04 | −5.8395E−05 | −2.6452E−05 | −1.1050E−05 |
| 11 | 5.0952E−05 | −3.0969E−05 | −3.3076E−05 | −1.7364E−05 |
| 12 | −5.4899E−06 | −2.6607E−06 | −3.5364E−06 | −1.8463E−06 | surface number

| | A18 | A20 |
|---|---|---|
| 1 | −1.6311E−07 | −3.8822E−08 |
| 2 | −3.6985E−07 | −2.6563E−07 |
| 3 | −3.0366E−06 | −1.3751E−06 |
| 4 | −1.4368E−06 | −7.4195E−07 |
| 5 | 1.2256E−05 | 8.0223E−06 |
| 6 | 3.7156E−05 | 7.6828E−05 |
| 7 | 6.1442E−05 | −1.0199E−04 |
| 8 | 9.6764E−05 | −4.7935E−05 |
| 9 | 1.1760E−05 | −5.0376E−06 |
| 10 | −5.1001E−06 | −3.2266E−06 |
| 11 | −4.2767E−06 | 1.7705E−06 |
| 12 | −3.1434E−07 | 2.2844E−07 |

Figure 2:
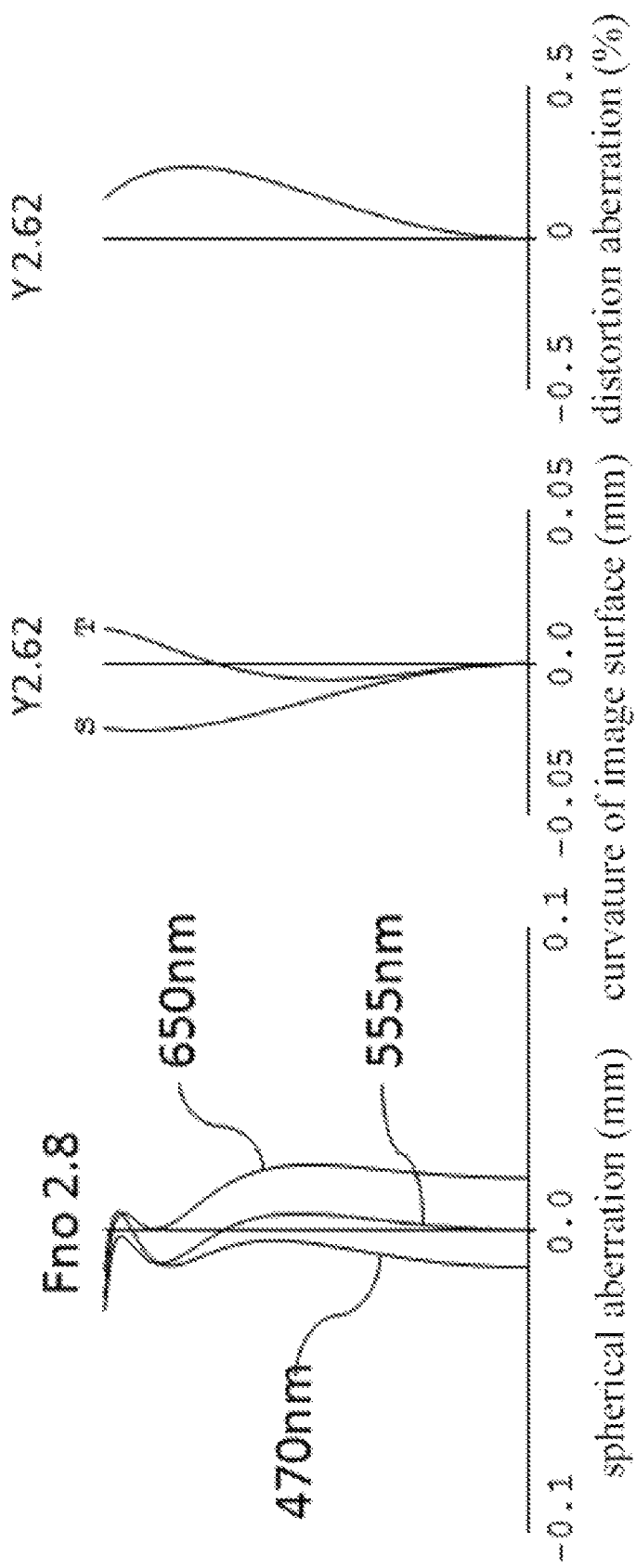
FIG. 2 is diagrams of spherical aberration, curvature of image surface, and distortion aberration of the imaging optical system of FIG. 1.

FIG. 2 shows the diagrams of spherical aberration, curvature of image surface, and distortion aberration of the imaging optical system according to the illustrated embodiment, the aberrations of wavelengths 650 nm, 555 nm, and 470 nm are shown. Additionally, in the diagram of curvature of image surface, "S" presents the aberration of the sagittal image surface, and "T" presents the aberration of the tangential image surface.

The description of tables of a second embodiment to a fourth embodiment is the same as the description of TABLE 1 to TABLE 3 of previously described the first embodiment, therefore the description thereof is omitted.

Figure 3:
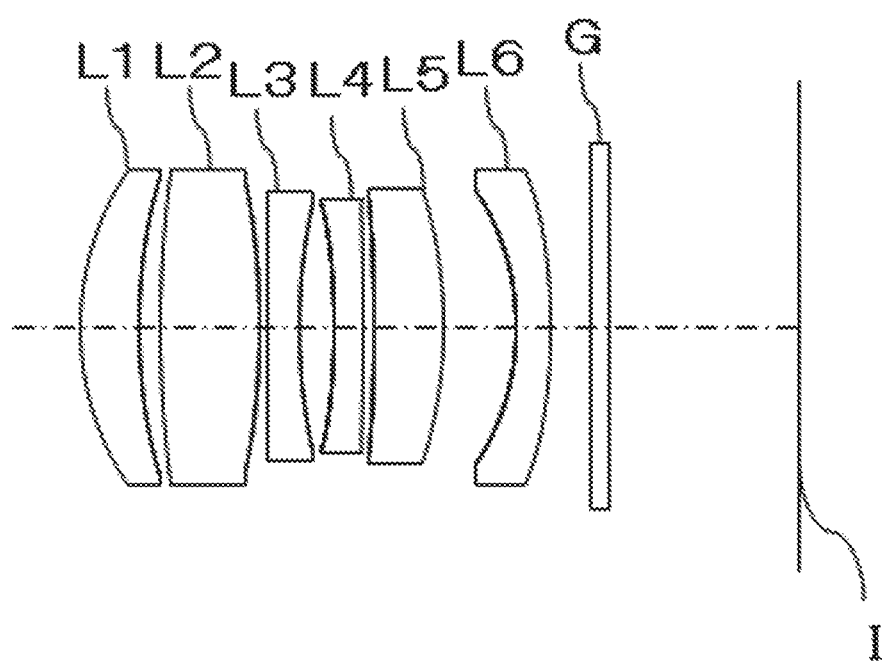
FIG. 3 is a cross-sectional view showing lenses structure of an imaging optical system according to a second embodiment.
Figure 4:
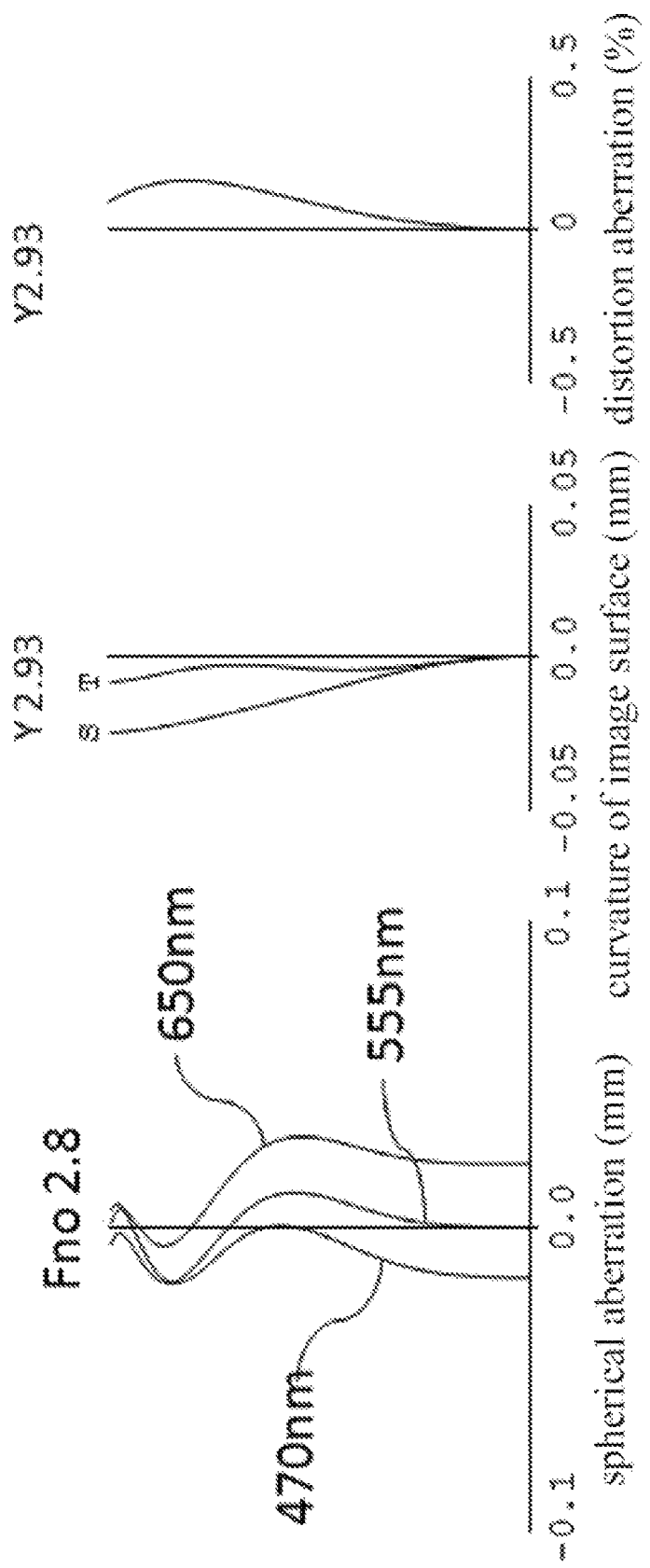
FIG. 4 is diagrams of spherical aberration, curvature of image surface, and distortion aberration of the imaging optical system of FIG. 3.

FIG. 3 shows lenses structure of the imaging optical system according to a second embodiment. The data of lenses of the imaging optical system according to the illustrated embodiment are shown in TABLE 4, the data of focal length f of overall system, the F-value, and the data of field angle are shown in TABLE 5, and the data of aspheric coefficients are show in TABLE 6. Additionally FIG. 4 shows the diagrams of spherical aberration, curvature of image surface, and distortion aberration of the imaging optical system according to the illustrated embodiment.

TABLE 4

Embodiment 2

| Si | Ri | Di | Ndi | vdi |
|---|---|---|---|---|
| 1 | 2.862 | 0.877 | 1.544 | 56.0 |
| 2 | 5.731 | 0.300 | | |
| 3 | 9.934 | 1.486 | 1.535 | 57.1 |
| 4 | −8.194 | 0.109 | | |
| 5 | 252.117 | 0.460 | 1.661 | 20.4 |
| 6 | 5.433 | 0.520 | | |
| 7 | −7.429 | 0.450 | 1.661 | 20.4 |
| 8 | −25.284 | 0.150 | | |
| 9 | −15.870 | 1.026 | 1.661 | 20.4 |
| 10 | −4.402 | 1.050 | | |
| 11 | −2.582 | 0.501 | 1.544 | 56.0 |
| 12 | −6.305 | 0.589 | | |
| 13 | infinity | 0.300 | 1.517 | 64.2 |
| 14 | infinity | 2.811 | | |

TABLE 5

Embodiment 2

| | |
|---|---|
| focal length f | 10.76 |
| F-value | 2.8 |
| field angle | 30.5 degree |

TABLE 6

Embodiment 2 surface number

| | K | A4 | A6 | A8 |
|---|---|---|---|---|
| 1 | 3.2802E−02 | −6.0442E−04 | −1.6220E−04 | 7.0563E−07 |
| 2 | 0.0000E+00 | 1.7436E−03 | 2.0774E−04 | −1.1192E−05 |
| 3 | 0.0000E+00 | −6.3866E−04 | 2.1473E−06 | 3.9475E−05 |
| 4 | 0.0000E+00 | 1.2655E−04 | −5.2649E−04 | −7.7839E−05 |
| 5 | 0.0000E+00 | −6.5270E−04 | 5.7888E−05 | −4.2231E−06 |
| 6 | 9.8374E−01 | 1.1195E−03 | −2.1981E−04 | 6.1431E−05 |
| 7 | 0.0000E+00 | −1.0145E−03 | −6.1916E−04 | −2.1262E−04 |
| 8 | 0.0000E+00 | 1.1878E−03 | 5.9856E−04 | 2.3246E−04 |
| 9 | 0.0000E+00 | −1.4383E−03 | −2.5474E−04 | −8.3632E−05 |
| 10 | −9.4988E−01 | 1.5549E−03 | −3.3709E−05 | −1.7805E−04 |
| 11 | 0.0000E+00 | 3.5209E−3 | −9.9401E−05 | −1.0311E−04 |
| 12 | 1.1909E−01 | −4.5733E−3 | −1.9416E−04 | −6.5140E−05 | surface number

| | A10 | A12 | A14 | A16 |
|---|---|---|---|---|
| 1 | −1.3988E−06 | −1.1821E−06 | −2.5451E−07 | −2.4050E−08 |
| 2 | 1.1117E−06 | 1.0541E−06 | −9.4854E−08 | −1.0299E−07 |
| 3 | 2.0144E−06 | −1.3290E−06 | −1.2117E−07 | 4.9684E−09 |
| 4 | 7.7450E−06 | 4.1673E−07 | −1.7105E−06 | 7.6780E−08 |
| 5 | −2.3871E−05 | −3.3749E−06 | 1.0454E−06 | 7.6420E−08 |
| 6 | 1.1294E−05 | −1.2755E−05 | −1.2174E−05 | −4.9601E−06 |
| 7 | −3.2340E−05 | −7.6586E−06 | −1.1951E−05 | −1.0336E−05 |
| 8 | 3.6456E−05 | −6.3357E−06 | −3.9896E−06 | 9.9518E−07 |
| 9 | −1.9274E−05 | 3.8029E−07 | 2.6025E−06 | 9.0930E−07 |
| 10 | −4.5475E−05 | −7.1366E−06 | −3.3189E−07 | 1.5506E−06 |

TABLE 6-continued

Embodiment 2

| 11 | −4.3430E−05 | −2.1247E−05 | −4.6754E−06 | 3.2840E−06 |
|---|---|---|---|---|
| 12 | −1.9376E−05 | −2.6624E−07 | 8.1258E−07 | −1.8154E−09 |

Figure 5:
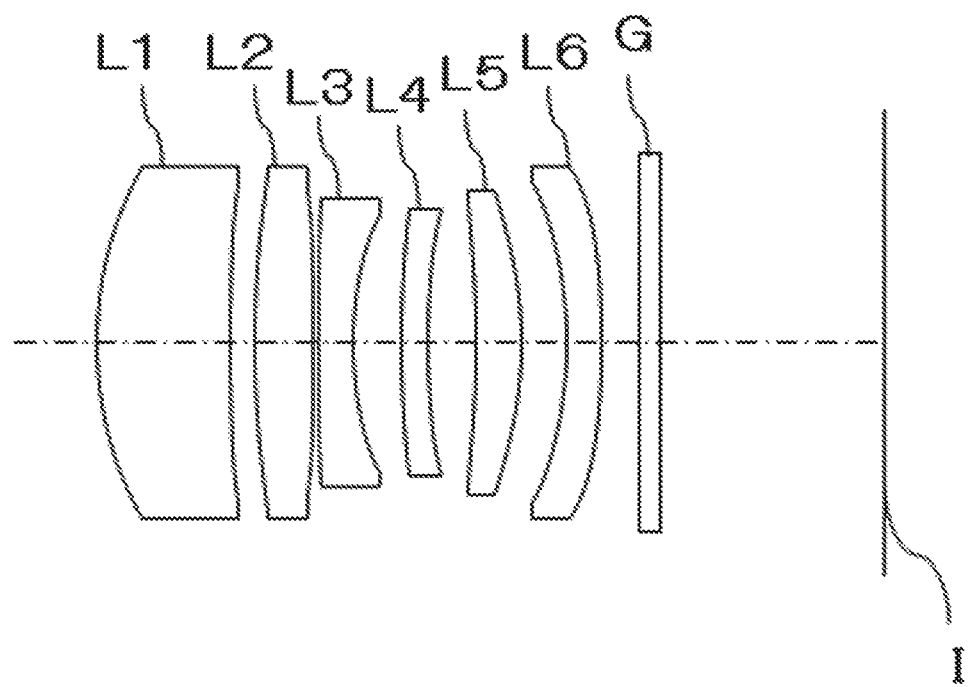
FIG. 5 is a cross-sectional view showing lenses structure of an imaging optical system according to a third embodiment.
Figure 6:
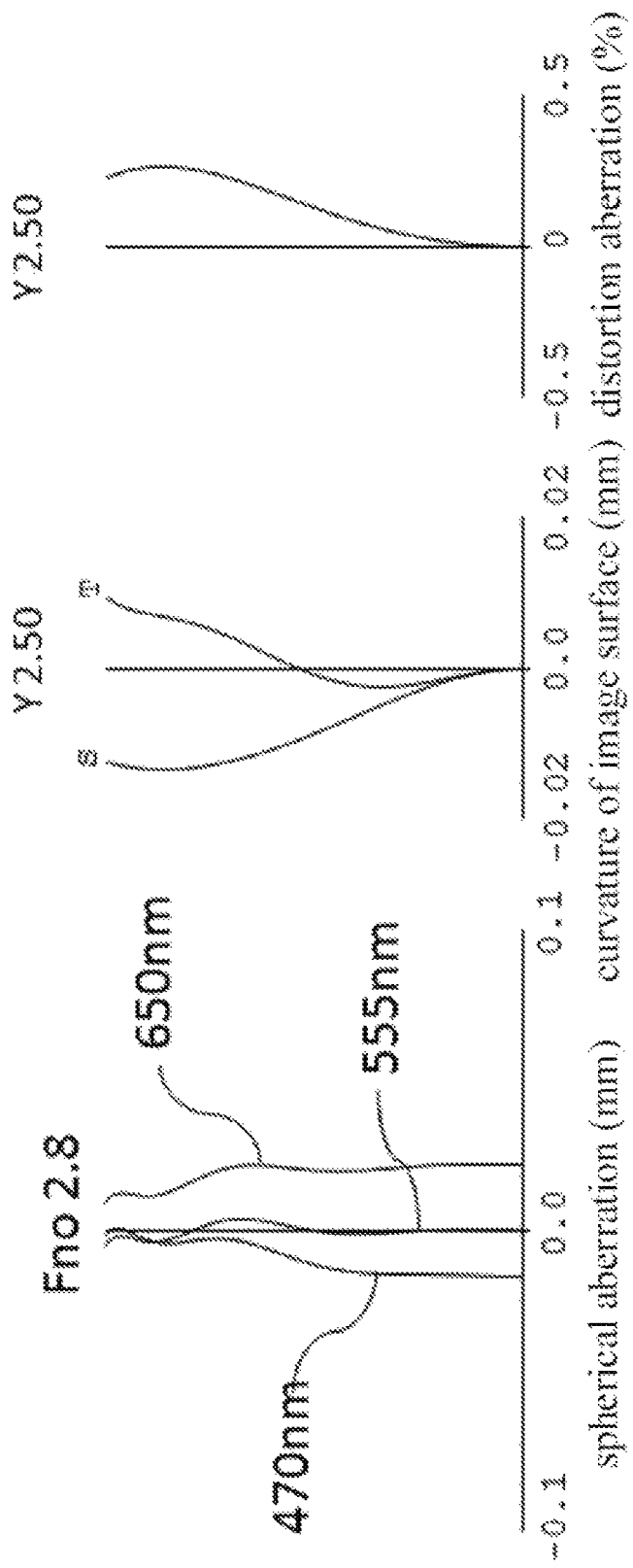
FIG. 6 is diagrams of spherical aberration, curvature of image surface, and distortion aberration of the imaging optical system of FIG. 5.

FIG. 5 shows lenses structure of the imaging optical system according to a third embodiment. The data of lenses of the imaging optical system according to the illustrated embodiment are shown in TABLE 7, the data of focal length f of overall system, the F-value, and the data of field angle are shown in TABLE 8, and the data of aspheric coefficients are show in TABLE 9. Additionally, FIG. 6 shows the diagrams of spherical aberration, curvature of image surface, and distortion aberration of the imaging optical system according to the illustrated embodiment.

TABLE 7

Embodiment 3

| Si | Ri | Di | Ndi | vdi |
|---|---|---|---|---|
| 1 | 3.228 | 1.790 | 1.544 | 56.0 |
| 2 | 23.642 | 0.310 | | |
| 3 | 8.620 | 0.758 | 1.535 | 57.1 |
| 4 | −106.730 | 0.104 | | |
| 5 | 73.119 | 0.432 | 1.661 | 20.4 |
| 6 | 3.156 | 0.654 | | |
| 7 | 9.345 | 0.348 | 1.661 | 20.4 |
| 8 | 7.000 | 0.650 | | |
| 9 | −9.424 | 0.604 | 1.661 | 20.4 |
| 10 | −3.409 | 0.616 | | |
| 11 | −3.409 | 0.445 | 1.544 | 56.0 |
| 12 | −8.785 | 0.500 | | |
| 13 | infinity | 0.300 | 1.517 | 64.2 |
| 14 | infinity | 2.995 | | |

TABLE 8

Embodiment 3

| | |
|---|---|
| focal length f | 10.802 |
| F-value | 2.8 |
| field angle | 26 degree |

TABLE 9

Embodiment 3 surface number

| | K | A4 | A6 | A8 |
|---|---|---|---|---|
| 1 | −8.0593E−02 | −2.7725E−04 | 5.8599E−05 | −7.4807E−05 |
| 2 | 0.0000E+00 | 5.3960E−04 | 8.3837E−04 | 2.7800E−04 |
| 3 | 0.0000E+00 | −3.7850E−03 | 1.2753E−03 | 1.9749E−04 |
| 4 | 0.0000E+00 | −5.4401E−04 | 7.1764E−04 | −7.8522E−04 |
| 5 | 0.0000E+00 | 3.8007E−04 | 3.8957E−04 | 1.6378E−04 |
| 6 | 8.2689E−01 | 1.2354E−03 | 1.0200E−03 | 5.1710E−06 |
| 7 | 0.0000E+00 | −5.4363E−04 | −2.0753E−04 | −1.7068E−06 |
| 8 | 3.7625E+00 | 1.5075E−03 | 1.0846E−03 | 5.6555E−04 |
| 9 | 0.0000E+00 | −2.3589E−03 | 1.2063E−03 | 6.7833E−04 |
| 10 | −1.1180E+00 | 5.2460E−03 | 7.6977E−04 | −1.1283E−05 |
| 11 | −8.1784E−01 | 4.6040E−03 | −1.1223E−03 | −5.0127E−04 |
| 12 | 0.0000E+00 | −9.2293E−03 | −5.2893E−04 | −3.1304E−04 |

TABLE 9-continued

Embodiment 3

| | surface number | | | |
|---|---|---|---|---|
| | A10 | A12 | A14 | A16 |
| 1 | 3.7665E−05 | −2.4918E−07 | −1.8768E−06 | 2.6285E−07 |
| 2 | −7.1003E−06 | −9.5630E−06 | −1.6688E−06 | 9.3020E−07 |
| 3 | −8.5221E−05 | −3.1876E−06 | 7.8243E−06 | −5.3760E−07 |
| 4 | 1.6402E−04 | 1.7119E−05 | −2.7469E−05 | 4.6581E−06 |
| 5 | 2.5299E−05 | 9.6081E−06 | 6.8577E−07 | −1.6742E−06 |
| 6 | 3.4570E−04 | 6.9497E−05 | 9.9728E−06 | −4.2532E−06 |
| 7 | 6.1915E−05 | 4.8042E−05 | 9.1019E−06 | −4.4025E−06 |
| 8 | 1.5205E−04 | −4.2428E−06 | −1.2882E−05 | −4.2634E−07 |
| 9 | 1.9087E−05 | −2.0707E−05 | −1.2358E−05 | 2.3234E−06 |
| 10 | 2.5884E−05 | −8.2925E−06 | −6.0223E−06 | 3.6287E−07 |
| 11 | −2.6705E−05 | 8.4888E−06 | −5.5317E−07 | −8.3726E−07 |
| 12 | 3.6699E−05 | −5.6081E−06 | 6.2637E−08 | −4.3053E−08 |

Figure 7:
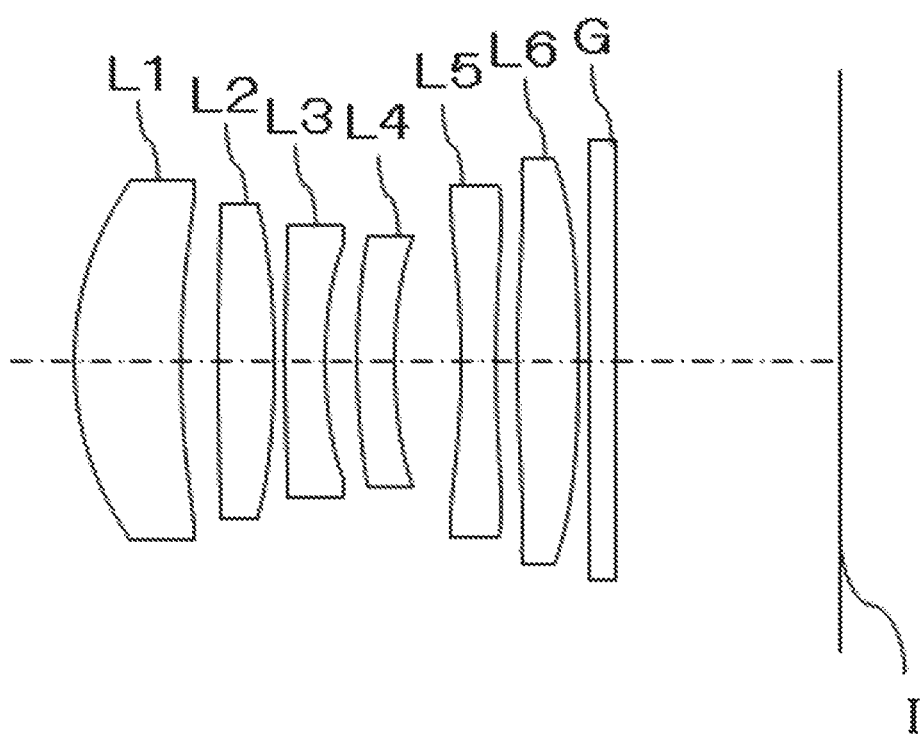
FIG. 7 is a cross-sectional view showing lenses structure of an imaging optical system according to a fourth embodiment.
Figure 8:
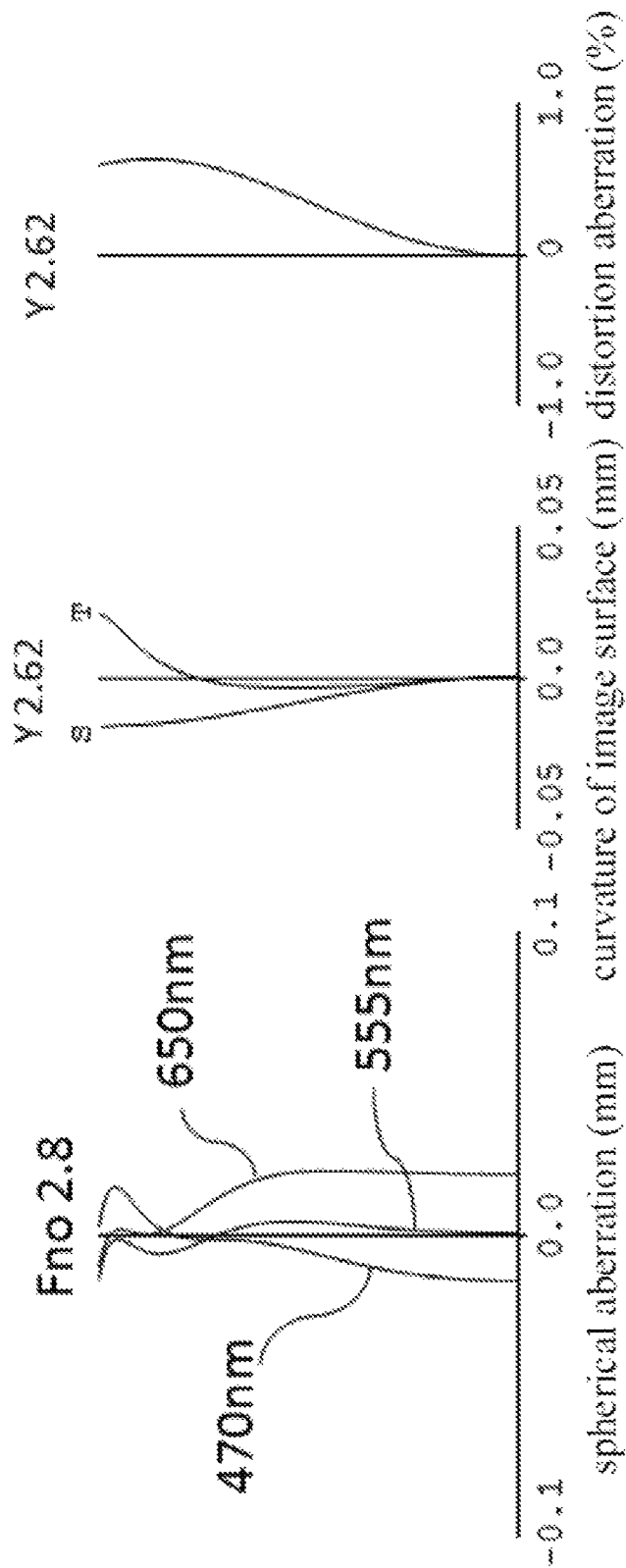
FIG. 8 is diagrams of spherical aberration, curvature of image surface, and distortion aberration of the imaging optical system of FIG. 7.

FIG. 7 shows lenses structure of the imaging optical system according to a fourth embodiment. The data of lenses of the imaging optical system according to embodiment 4 are shown in TABLE 10, the data of focal length f of overall system, the F-value, and the data of field angle are shown in TABLE 11, and the data of aspheric coefficients are show in TABLE 12. Additionally, FIG. 8 shows the diagrams of spherical aberration, curvature of image surface, and distortion aberration of the imaging optical system according to the illustrated embodiment.

TABLE 10

Embodiment 4

| Si | Ri | Di | Ndi | vdi |
|---|---|---|---|---|
| 1 | 2.305 | 1.170 | 1.544 | 56.0 |
| 2 | 6.449 | 0.424 | | |
| 3 | 31.066 | 0.611 | 1.535 | 57.1 |
| 4 | −6.202 | 0.122 | | |
| 5 | 18.265 | 0.442 | 1.661 | 20.4 |
| 6 | 3.203 | 0.369 | | |
| 7 | 4.856 | 0.403 | 1.661 | 20.4 |
| 8 | 3.464 | 0.734 | | |
| 9 | −6.689 | 0.399 | 1.544 | 56.0 |
| 10 | 9.500 | 0.246 | | |
| 11 | 11.896 | 0.677 | 1.661 | 20.4 |
| 12 | −10.135 | 0.100 | | |
| 13 | infinity | 0.300 | 1.517 | 64.2 |
| 14 | infinity | 2.497 | | |

TABLE 11

Embodiment 4

| focal length f | 9.081 |
|---|---|
| F-value | 2.8 |
| field angle | 30 degree |

TABLE 12

Embodiment 4

| | surface number | | | |
|---|---|---|---|---|
| | K | A4 | A6 | A8 |
| 1 | −3.1117E−01 | 7.9404E−04 | −2.6067E−04 | −8.0806E−05 |
| 2 | 0.0000E+00 | 1.0064E−03 | −6.6577E−04 | −2.5220E−04 |
| 3 | 0.0000E+00 | −9.9237E−06 | 1.0203E−03 | 2.3415E−04 |
| 4 | 0.0000E+00 | −6.4360E−04 | −8.4471E−04 | −3.0120E−04 |
| 5 | 0.0000E+00 | −2.7384E−03 | −9.4757E−04 | −6.1019E−04 |
| 6 | 0.0000E+00 | 8.3614E−03 | 5.9487E−03 | 4.0053E−03 |
| 7 | 0.0000E+00 | −1.0498E−02 | −2.2693E−03 | −1.9475E−04 |
| 8 | 0.0000E+00 | 1.1806E−02 | 2.4782E−03 | 1.3242E−03 |
| 9 | 0.0000E+00 | −2.1697E−04 | 3.4717E−03 | 1.3078E−04 |
| 10 | 0.0000E+00 | −7.6737E−03 | −2.1550E−03 | −4.7328E−04 |
| 11 | 0.0000E+00 | −5.0827E−03 | −1.3185E−03 | −6.3954E−05 |
| 12 | 0.0000E+00 | −9.4683E−03 | −3.2055E−04 | −4.2304E−05 |

| | surface number | | | |
|---|---|---|---|---|
| | A10 | A12 | A14 | A16 |
| 1 | −3.0135E−05 | −1.0233E−05 | −3.0357E−06 | −7.1499E−07 |
| 2 | −6.1403E−05 | −1.3905E−05 | −3.7462E−06 | 1.3081E−06 |
| 3 | −2.8387E−05 | −4.7194E−05 | −2.0680E−05 | −1.4143E−05 |
| 4 | −1.9537E−04 | −1.7586E−04 | −9.7762E−05 | 4.5446E−05 |
| 5 | −3.5273E−04 | −1.5604E−04 | −8.5653E−06 | 1.7329E−05 |
| 6 | 2.0994E−03 | 1.3656E−03 | 1.0710E−03 | 7.5013E−04 |
| 7 | 1.6491E−03 | 2.3200E−03 | 1.3499E−03 | −7.1875E−04 |
| 8 | 6.7469E−04 | 8.6565E−05 | 1.7555E−04 | −1.0510E−04 |
| 9 | 6.5622E−06 | −9.9058E−05 | −5.3022E−05 | 1.3664E−05 |
| 10 | 8.7678E−05 | −2.8039E−05 | −5.1983E−06 | 1.2342E−06 |
| 11 | −6.6865E−06 | −8.5498E−06 | −1.6340E−06 | 1.6469E−06 |
| 12 | −2.3659E−07 | 3.8864E−06 | −5.3460E−06 | 1.3960E−06 |

In the specification, the values corresponding to condition (1) to condition (4), condition (6), and condition (7) of the imaging optical systems according to embodiment 1 to embodiment 4 are shown in TABLE 13. Referring to TABLE 13, it can be seen that in the imaging optical systems according to the embodiments, condition (1) to condition (4), condition (6), and condition (7) are all satisfied. Additionally, in the imaging optical systems according to the embodiments, the radius of curvature R10 of the fifth lens L5 facing the image side and the radius of curvature R11 of the sixth lens L6 toward the object side are both positive or both negative, therefore the condition (5) is satisfied.

TABLE 13

| number | condition | embodiment 1 | embodiment 2 | embodiment 3 | embodiment 4 |
|---|---|---|---|---|---|
| 1 | Y/f | 0.287 | 0.273 | 0.231 | 0.288 |
| 2 | TTL/f | 0.951 | 0.988 | 0.972 | 0.935 |
| 3 | D/f | 0.601 | 0.699 | 0.667 | 0.627 |
| 4 | f/f4 | 0.116 | −0.675 | −0.2 | −0.443 |
| 6 | R1/f | 0.261 | 0.266 | 0.299 | 0.254 |
| 7 | f12/f | 0.492 | 0.467 | 0.461 | 0.461 |

Figure 9:
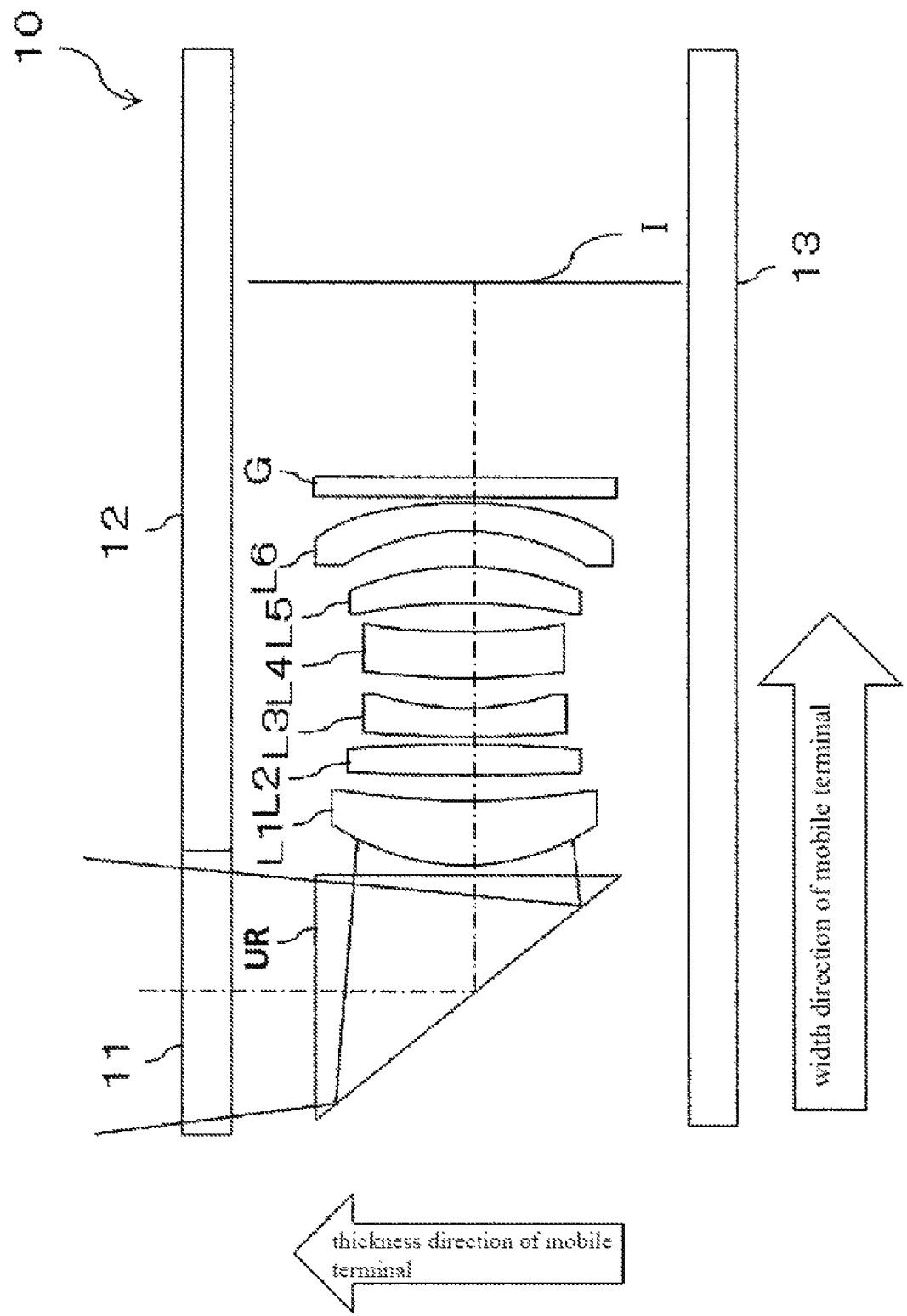
FIG. 9 is a cross-sectional view showing a structure of the imaging optical system according to the first embodiment having a prism as an optical path deflecting part.

Also, referring to FIG. 9, the imaging optical system according to the first embodiment is mounted in a mobile terminal 10 such as a mobile phone or a smartphone. A right angle prism using total reflection is further arranged at the object side of the first lens L1 as an optical path deflecting part UR that deflects the optical axis by about 90 degrees using full reflection. Additionally, the optical path deflecting part UR is configured on a rear side of a glass cover 11 of the mobile terminal 10, the optical path deflecting part UR and the first lens L1 to the sixth lens L6 are configured on a width direction between one side of a display part 12 such as a liquid crystal display on the mobile terminal 10 and a read surface cover 13. Furthermore, a mirror can be configured as the optical path deflecting part UR to replace the right angle prism. Since an imaging optical system with narrow field angle has a relatively longer focal length, the TTL is relatively longer. Therefore, when mounted on the mobile terminal 10 such as the mobile phone and smartphone, the thickness of the mobile terminal 10 has to be increased. Via using optical path deflecting part UR such as a prism or a mirror, the optical path that is from the object and passes the glass cover 11 gets perpendicularly bent, thus a sufficient amount of light is ensured. Also, since the long focal length first lens L1 to the sixth lens L6 with relatively smaller effective radius can be configured on the width direction, the mobile terminal 10 can be made thinner.

Accordingly, the imaging optical systems according to the embodiments have narrow field angles and can get images with high resolution while digital zooming.

Although the present disclosure is illustrated and described herein with reference to specific embodiments, the present disclosure is not intended to be limited to the details shown. Rather, various modifications may be made in the details within the scope and range of equivalents of the claims and without departing from the present disclosure. For example, according to previously described embodiments, the two surfaces of the first lens L1 to the sixth lens L6 are aspherical, however, the convergence of the light finally reaching the image surface I can be ensured while at least one surface of the two surfaces is aspherical.

What is claimed is:

1. An imaging optical system, comprising, in order from an object side toward an image side:
   a first lens being a meniscus lens with a positive refractive power, the first lens having a convex surface facing the object side, and at least one of two surfaces thereof having an aspherical shape;
   a second lens being a biconvex lens, and at least one of two surfaces having an aspherical shape;
   a third lens being a meniscus lens with a negative refractive power, the third lens having a convex surface facing the object side, and at least one of two surfaces having an aspherical shape;
   a fourth lens being a meniscus lens, the fourth lens having a convex surface or a concave surface facing the object side, and at least one of two surfaces having an aspherical shape;
   a fifth lens having a concave surface facing the object side, and at least one of two surfaces having an aspherical shape; and
   a sixth lens having a convex surface facing the image side, and at least one of two surfaces having an aspherical shape,
   wherein the imaging optical system satisfies the following conditions (1) and (2):

$$0.23 < Y/f < 0.29 \quad (1)$$

$$0.9 < TTL/f < 1.0 \quad (2)$$

wherein Y is a maximal image height, f is a focal length of the overall imaging optical system, and TTL is a total track length.

2. The imaging optical system according to claim 1, wherein the imaging optical system further satisfies the following condition (3):

$$0.6 < D/f < 0.8 \quad (3)$$

wherein D is a distance between the surface of the first lens facing the object side and the surface of the sixth lens facing the image side.

3. The imaging optical system according to claim 1, wherein the imaging optical system further satisfies the following conditions (4) and (5):

$$-0.7 < f/f4 < 0.7 \quad (4)$$

$$0 < R10/R11 \quad (5)$$

wherein f4 is a focal length of the fourth lens, R10 is a radius of curvature of the surface of the fifth lens facing the image side, and R11 is a radius of curvature of the surface of the sixth lens facing the object side.

4. The imaging optical system according to claim 1, wherein the imaging optical system further satisfies the following condition (6):

$$0.25 < R1/f \quad (6)$$

wherein R1 is a radius of curvature of the surface facing the object side of the first lens.

5. The imaging optical system according to claim 1, wherein the imaging optical system further satisfies the following condition (7):

$$0.35 < f12/f < 0.65 \quad (7)$$

wherein f12 is a combined focal length of the first lens and the second lens.

6. The imaging optical system according to claim 1, wherein the first to the sixth lenses are made of a resin material.

7. The imaging optical system according to claim 1, further comprising a prism or a mirror arranged at the object side of the first lens and configured to deflect an optical axis by about 90 degrees.

* * * * *